(12) United States Patent
Truelsen

(10) Patent No.: US 11,685,614 B2
(45) Date of Patent: Jun. 27, 2023

(54) AUTOMATED LIFTING DEVICE

(71) Applicant: COBOT LIFT APS, Slagelse (DK)

(72) Inventor: Flemming Bischoff Truelsen, Slagelse (DK)

(73) Assignee: COBOT LIFT APS

( * ) Notice: Subject to any disclaimer, the term of this patent is extended or adjusted under 35 U.S.C. 154(b) by 525 days.

(21) Appl. No.: 16/769,217

(22) PCT Filed: Dec. 10, 2018

(86) PCT No.: PCT/EP2018/084115
§ 371 (c)(1),
(2) Date: Jun. 2, 2020

(87) PCT Pub. No.: WO2019/110843
PCT Pub. Date: Jun. 13, 2019

(65) Prior Publication Data
US 2021/0170574 A1 Jun. 10, 2021

(51) Int. Cl.
*B65G 47/91* (2006.01)
*B25J 15/06* (2006.01)
(52) U.S. Cl.
CPC .......... *B65G 47/91* (2013.01); *B25J 15/0616* (2013.01)
(58) Field of Classification Search
CPC ... B65G 47/91; B25J 15/0616; B25J 15/0683; B25J 15/06; B25J 18/02; B25J 9/046; B66C 13/08; B66C 23/02; B66C 1/02
See application file for complete search history.

(56) References Cited

U.S. PATENT DOCUMENTS 3,709,379 A 1/1973 Kaufeldt
3,899,087 A 8/1975 Tamble et al.
(Continued)

FOREIGN PATENT DOCUMENTS

CN 102387980 A 3/2012
CN 102518606 A 6/2012
(Continued)

OTHER PUBLICATIONS

Danish Patent and Trademark Office, Search Opinion for application No. PA 2017 70923, dated Jun. 7, 2018, 2 pages.
(Continued)

*Primary Examiner* — Stephen A Vu
(74) *Attorney, Agent, or Firm* — Ware, Fressola, Maguire & Barber LLP

(57) ABSTRACT

The present invention relates to a lifting device for lifting and vertically, and possibly horizontally, replacing an object. The lifting device comprises a first unit (1) configured with one or more catching parts such as suction pads and a second unit (2) configured to control vertical and optionally horizontal position of the object.
The second unit (2) comprises a first attachment position and a second attachment position and
the first attachment position is fixed to a vertically extending part (3) of the first unit (1);
the second attachment position is fixed to a sliding member (10) of the first unit (1) by a rigid joint configured to transfer all movements induced at the second attachment position by the second unit (2) to a sliding member (10) of the first unit configured to slide between two positions along a longitudinal member (11) of the first unit.

19 Claims, 6 Drawing Sheets

(56) References Cited

U.S. PATENT DOCUMENTS

| | | | |
|---|---|---|---|
| 3,912,317 | A | 10/1975 | Ohnaka |
| 3,940,172 | A | 2/1976 | Hutson et al. |
| 4,753,104 | A | 6/1988 | Strozier |
| 5,118,154 | A | 6/1992 | Assalita et al. |
| 5,330,314 | A | 7/1994 | Bennison |
| 5,816,635 | A | 10/1998 | Jansson |
| 6,367,855 | B1 | 4/2002 | Schmalz et al. |
| 8,418,522 | B1 | 4/2013 | Liao |
| 9,638,217 | B2 | 5/2017 | Yang |
| 9,937,628 | B2 * | 4/2018 | Werner ............... B25J 15/04 |
| 10,781,089 | B2 | 9/2020 | Finkbeiner |
| 2005/0258657 | A1 | 11/2005 | Gebauer et al. |
| 2009/0028681 | A1 * | 1/2009 | Huang ............... B25J 15/0052 414/590 |
| 2013/0037766 | A1 | 2/2013 | Liao |
| 2014/0360961 | A1 | 12/2014 | Steffes |
| 2015/0063972 | A1 * | 3/2015 | Girtman ............... B65G 61/00 901/1 |
| 2016/0257503 | A1 * | 9/2016 | Komuro ............... B65G 47/91 |

FOREIGN PATENT DOCUMENTS

| | | |
|---|---|---|
| CN | 104591005 A | 5/2015 |
| CN | 104925675 A | 9/2015 |
| CN | 107 378 990 A | 11/2017 |
| DE | 1 481 764 A1 | 8/1969 |
| DE | 199 28 734 A1 | 12/2000 |
| EP | 0 493 979 A1 | 7/1992 |
| EP | 0 841 297 A1 | 5/1998 |
| GB | 1 393 733 A | 5/1975 |
| JP | H02-262978 A | 10/1990 |
| JP | H10-503159 A | 3/1998 |
| JP | 2003-165081 A | 6/2003 |
| KR | 10-2012-0042135 A | 5/2012 |
| KR | 10-1667151 B1 | 10/2016 |
| SE | 529 625 C2 | 10/2007 |
| WO | 2007/094720 A1 | 8/2007 |

OTHER PUBLICATIONS

Bibliographic data including English Abstract for KR 10-1667151 B1, 3 pages.
Bibliographic data including English Abstract for JP 2003-165081A, 3 pages.
Danish Patent and Trademark Office, Search Report for application No. PA 2017 70923, dated Jun. 7, 2018, 4 pages.
Letter of Jun. 7, 2018 from Dabnish Patent and Trademark Office with 1st technical examination for application No. PA 2017 70923, 2 pages.
Machine translation by EPO of KR101667151B, 6 pages.
Machine translation by EPO of JP2003165081B1, 5 pages.
English translation of Japanese Office Action dated Oct. 27, 2022 for Japanese counterpart application No. 2020-550908, 3 pages.
English translation of Chinese Office Action dated Dec. 29, 2021, Application No. 201880079128.8 for Automated Lifting Device, Applicant Cabot Lift APS, 3 pages.
Chinese Search Report dated Dec. 23, 2021 for application No. 2018800791288, 1 page.
Biblíoigraphic Data including English Abstract for Foreign Patent Document (CN104925675A), 3 pages.
Biblíoigraphic Data including English Abstract for Foreign Patent Document (Publication No. CN104591005), 3 pages.
International Search Report (ISR), application PCT/EP2018/084115, dated Mar. 1, 2019, 4 pages.
Written Opinion of the International Searching Authority (ISA/EP), application PCT/EP2018/084115, dated Mar. 1, 2019, 5 pages.

* cited by examiner

AUTOMATED LIFTING DEVICE

TECHNICAL FIELD OF THE INVENTION

The present invention relates to a lifting device for lifting and vertically, and possibly horizontally, replacing an object. The lifting device comprises a first unit configured with one or more catching parts such as suction pads and a second unit configured to control vertical and optionally horizontal position of the object.

BACKGROUND OF THE INVENTION

EP0493979 (A1) (see U.S. Pat. No. 5,330,314A for US counterpart) discloses a traditional vacuum lifting/hoisting device where the expansion or contraction of a variable length bellows-like lift tube is controlled by controlling the vacuum level within the lift tube, which level is in turn controlled by a user operable valve to connect and/or isolate the interior of the lift tube to atmosphere. Thus, in a fully open valve position, the lift tube interior is open to atmosphere, the vacuum within the lift tube is destroyed and, with the tube hanging vertically from a suspension point, the lift tube falls to its maximum expanded length. Conversely, in a fully closed valve position, the vacuum is at a maximum and the tube rises to its maximum contracted position—being in use a maximum lift height. It follows that intermediate opening of the valve achieves an intermediate position. A device according to EP0493979 (A1) discloses a vacuum lifting/lowering head 12 comprising a fixed upper handle 2 adapted to be gripped by one hand 3 of a user 4. The head 12 also comprises a movable lower handle 7 suitable for one hand manual operation. A triangular opening 10 is provided in a part of the head 12, and a correspondingly triangular valve member 11 in the form of a simple cover plate is attached to lower handle 7 and displaceable by the user's movement of the lower handle 7. With the opening 10 completely closed off by valve member 11, a maximum vacuum level exists within the lift tube 23, which therefore contracts, bellows-like, to its minimum length bringing the vacuum lifting head to its maximum height. Hence, the first requirement is for the user to lower the head 12 until it engages an article 18 to be lifted, relocated and then lowered. Thus, with the palm of the user's hand 3 gripping the fixed handle 2 the user's fingers, directed downwardly, engage and push downwardly on the lower movable handle 7. This exposes the aperture 10, destroys the vacuum within the lift tube 23 by an in-rush of atmospheric air through the opening 10 exceeding the evacuation capacity of the associated vacuum pump, until the lifting head 12 suspended by the lift tube 23, contacts the article 18 under the guidance of the user by suitably maneuvering the fixed handle 2. Then, an upward pull on the movable handle 7 partially closes off the opening 10 to re-establish a vacuum within both the lift tube 23 and lifting head 12. With partial opening of the opening 10 by the valve member 11, to an extent controlled by the user, the article 18 is gripped and is in a hover mode, at a user-controllable height. With further upward movement by the user on the movable handle 7, the opening 10 is completely closed off by the valve member 11 and the article 18 may be raised to maximum height and relocated. It follows that in the relocated position, partial exposure of the opening 10 by user-control of the valve member 11 lowers the lift head 12 and article 18, while full exposure releases an article 18 that has previously been lifted, moved and lowered.

WO2007094720 discloses a vacuum hoisting device with a vertical hoisting tube suspended at an upper end and connected to a vacuum source adapted to be switched on and off, which tube at a lower end is provided with a suction foot and a positioning handle secured to the suction foot for manoeuvring the suction foot, and a manually operated valve device for permitting admission of air to the hoisting tube such that the hoisting tube is axially extensible and contractible in dependence on the air pressure prevailing in the hoisting tube.

The device comprises a tubular positioning handle and constitutes an oblique, downwards directed connection between the interior of the hoisting tube and the interior of the suction foot, and provided with an outside, axially slidingly mounted grip sleeve positioned between an upper and a lower end position, the grip sleeve is connected to the manually operated valve device by a connecting means and when the grip sleeve is slided towards its lower end position against the action of a spring then the valve device is forced to open. Without actuation of the grip sleeve the valve device is closed and with working suction source the suction foot is kept hanging immovable or is slowly lifted to an upper lift position depending on the trimming of the vacuum hoisting device. When the grip sleeve is slided downwards, the valve device is opened and air flows into the hoisting tube, the vacuum in hoisting tube is reduced and the suction foot is lowered. After the suction foot has been positioned on an object the grip sleeve can be slided upwards so that the valve device assisted by the spring force acting on the valve device is closed, and the object is sucked firmly to the suction foot and by this is lifted upwards when the hoisting tube starts contracting due to the increasing vacuum inside the hoisting tube.

DESCRIPTION OF THE INVENTION

The purpose of the present invention is to provide a lifting device having improved benefits in respect of being safer to work with. As the system includes a robot, employees can work close to the system as it will stop if it encounters something. This feature makes it possible to avoid covering the device and provides a more compact design.

Generally easier to program. The customer can adjust the programs themselves, thus avoiding expenses for external specialists.

Quick installation. Less equipment and less programming compared to traditional systems.

Faster delivery as the systems are simpler

According to a first aspect, the present invention relates to a lifting device comprising a first unit (1) and a second unit (2), the first unit (1) is configured to catch and/or hold an object and provide power for moving the object in a vertical direction, and the second unit (2) is configured to control a vertical position of the object, wherein the first unit (1) comprises:

a stationary vertically extending part (3), a horizontally extending part (4) and a lifting part (12) such as a hoisting tube comprising a first and a second attachment position, at the first attachment position the lifting part (12) is attached or fixed to the horizontally extending part (4) and at the second attachment position the lifting part (12) is attached or fixed to a longitudinal member (11), the longitudinal member (11) comprises a catching part (5) such as a suction pad;

a sliding member (10) is configured to slide in two directions between a first and a second end position along the longitudinal member (11), and the actual position of the sliding member (10) relative to the longitudinal member (11) is configured to determine the lifting power of the lifting part (12); the second unit (2) comprises a first attachment position and a second attachment position and the first attachment position is fixed to the vertically extending part (3) of the first unit (1);

the second attachment position is fixed to the sliding member (10) of the first unit (1) by a rigid joint configured to transfer all movements induced at the second attachment position by the second unit (2) to the sliding member (10).

According to one or more embodiments of the lifting device the second unit (2) may be configured to control a horizontal position of the object and the second unit (2) may be configured to move relative to the horizontally extending part (4). The movement may comprise a pivotal movement around the vertically extending part (3) and/or a linear movement along the horizontally extending part (4).

According to one or more embodiments of the lifting device the second unit (2) may comprise or be constituted of a robot configured to control the horizontal and vertical position of the second attachment position relative to the first attachment position where a robot is defined as a component or system capable of carrying out a series of actions or movements automatically.

According to one or more embodiments of the lifting device the longitudinal member (11) may comprise a central opening through which air may be forced during operation, the longitudinal member (11) may be configured with an opening (13) extending in the longitudinal direction of the wall of the longitudinal member (11). The opening (13) allows air to flow to and from the central opening and the surroundings, the opening (13) is configured so that the opening (13) may be covered by the sliding member (10) when the sliding member is at the first end position whereas the opening (13) is not covered or only partly covered by the sliding member (10) when the sliding member (10) is at the second end position. The phrase "extending in the longitudinal direction of the wall of the longitudinal member" indicates that the opening has an extent that will allow a control or variation of the opening, normally the opening may extend over 0.2-0.9 times the length of the longitudinal member (11), e.g. the opening (13) may extend over 0.25-0.75 times the length of the longitudinal member (11). E.g. the opening should be at least 5 cm long, i.e. extend over 5 cm, preferably the opening should be at least 10 cm long, i.e. extend over at least 10 cm.

According to one or more embodiments of the lifting device the sliding member (10) may have an inner surface profile corresponding to an outer surface profile of the longitudinal member (11) of the first unit (1).

According to one or more embodiments of the lifting device the corresponding surface profiles may not be not round or a similar shape allowing rotation of the sliding member (10) relative to the longitudinal member (11).

According to one or more embodiments of the lifting device the sliding member (10) may have an inner surface profile corresponding to an outer surface profile of the longitudinal member (11) of the first unit (1), and the corresponding profiles may be polygonal e.g. rectangular or oval or have a protruding part e.g. a longitudinal extending bar or similar preventing rotation of the sliding member (10) relative to the longitudinal member (11).

According to one or more embodiments of the lifting device the lifting part (12) may be a vacuum hoisting tube (12) connected to a vacuum source adapted to be switched on and off, which vacuum hoisting tube (12) may be connected to the longitudinal member (11) allowing an airflow generated by the vacuum source through both the vacuum hoisting tube (12) and the longitudinal member (11).

According to one or more embodiments of the lifting device, the lifting device may comprise a valve device (13) configured to admit air to the hoisting tube (12) so that the hoisting tube may be axially extensible and contractible in dependence on the air pressure prevailing in the hoisting tube.

According to one or more embodiments of the lifting device the position of the sliding member (10) may control the opening of the valve device (13).

According to one or more embodiments of the lifting device the valve device may be constituted by an opening (13) extending in the longitudinal direction of the longitudinal member (11). The phrase "extending in the longitudinal direction of the wall of the longitudinal member" indicates that the opening has an extent that will allow a control or variation of the opening, normally the opening may extend over 0.2-0.9 times the length of the longitudinal member (11), e.g. the opening (13) may extend over 0.25-0.75 times the length of the longitudinal member (11). E.g. the opening should be at least 5 cm long, i.e. extend over 5 cm, preferably the opening should be at least 10 cm long, i.e. extend over at least 10 cm.

According to one or more embodiments of the lifting device the second unit (2) may comprise at least two pieces or arms joined by a pivotal hinge and placed in extension of each other, and the second unit (2) may be at one end fixed pivotally to the vertically extending part (3) i.e. the one end may not be detached but it may pivot relative to the vertically extending part (3), and at a second end fixed to the sliding member (10), i.e. the second end may not move relative to the sliding member (10) but will move together with the sliding member (10).

According to one or more embodiments of the lifting device the second unit (2) at a first attachment position may be attached or fixed to fastening means (8) which are stationary relative to and fixed to the vertically extending part (3), and at the second attachment position the second unit (2) may comprise a control member (9) stationary relative to and fixed to the sliding member (10).

According to one or more embodiments of the lifting device the control member (9) and the sliding member (10) may comprise corresponding locking means configured to prevent the sliding member (10) from moving in any other directions relative to the longitudinal member (11) than a defined route between the first and second position along the longitudinal member (11).

According to one or more embodiments of the lifting device the lifting device may comprise a valve (14) positioned between the sliding member (10) and a catching part (5) in the form of a suction pad, which valve (14) may be configured to separate an air flow between the inside of a vacuum hoisting tube (12) and the inside of the suction pad (5).

According to one or more embodiments of the lifting device the valve (14) may comprise a unit (15) such as a plate which can moved between a closed position preventing air flow from hoisting tube (12) to suction pad (5) and an open position allowing air flow from hoisting tube (12) to suction pad (5).

According to one or more embodiments of the lifting device the longitudinal member (11) may comprise guiding means (18) positioned on a different surface, e.g. the opposite surface, relative to a valve device (13) formed as an opening, which guiding means (18) corresponds to a sliding part (19) of the sliding member (10), which sliding part (19) is adapted to slide along the guiding means (18).

According to one or more embodiments of the lifting device the sliding member (10) may comprise a closing part (20) adapted to close or eliminate air intake through a valve device (13) formed as an opening, the closing part (20) may be mounted floating i.e. the closing part (20) may be allowed to move in a direction perpendicular to the surface around the opening (13).

According to one or more embodiments of the lifting device the closing part (20) may be mounted by two or more protruding parts (20a) extending perpendicular to the surface around the opening (13) through openings in a cover (22) of the sliding member (10), the protruding parts (20a) are configured to be able to move in the perpendicular direction, but may not move in a direction parallel to the surface around the opening (13).

According to one or more embodiments of the lifting part (12) may be a vacuum hoisting tube (12) connected to a vacuum source which vacuum hoisting tube (12) is connected to the longitudinal member (11) allowing an airflow generated by the vacuum source through both the vacuum hoisting tube (12) and through the longitudinal member (11) providing a lifting power, optionally a second vacuum source may provide an independent vacuum for the catching part (5) in form of a suction pad.

Dictionary

In general—features described by these words in the context of the present document may be used in one or all embodiments of the invention as defined in the specification or in the claims.

Fix, fixed, fixedly—that two parts are fixed relative to each other means that the two parts cannot be released from each other but may be considered permanently attached to each other.

Air—the word "air" may generally be replaced with the word "gas" i.e. it is the functionality of air as a gas i.e. a fluid tending to expand indefinitely, which is relevant in connection with the present document, not the composition as such.

Robot—a component or system capable of carrying out a series of actions or movements automatically, normally a robot is programmable.

DETAILED DESCRIPTION OF THE INVENTION

In general, the present invention relates to a lifting device or hoisting device with similar functionality as described in respect of the prior art, where a vacuum lifting tube may be subjected to a continuous vacuum during operation and an opening in the lifting tube determines the pressure inside the lifting tube and whether an object is lifted, lowered or kept at a constant height.

A lifting device according to the present invention may be applied for lifting all kind of objects, especially objects comprising a smooth surface to which a catching part such as a suction pad may engage with a vacuum, e.g. the objects may be bags, sacks, buckets, barrels, packages, boxes or the like. The lifting device according to the present invention may be advantageously applied when lifting objects having a softer or more flexible outer surface such as bags or sacks or the like. If an object to be lifted does not have a smooth surface another catching part than a suction pad may be used e.g. a hook or a lifting surface on which an object may be placed.

Figure 1:
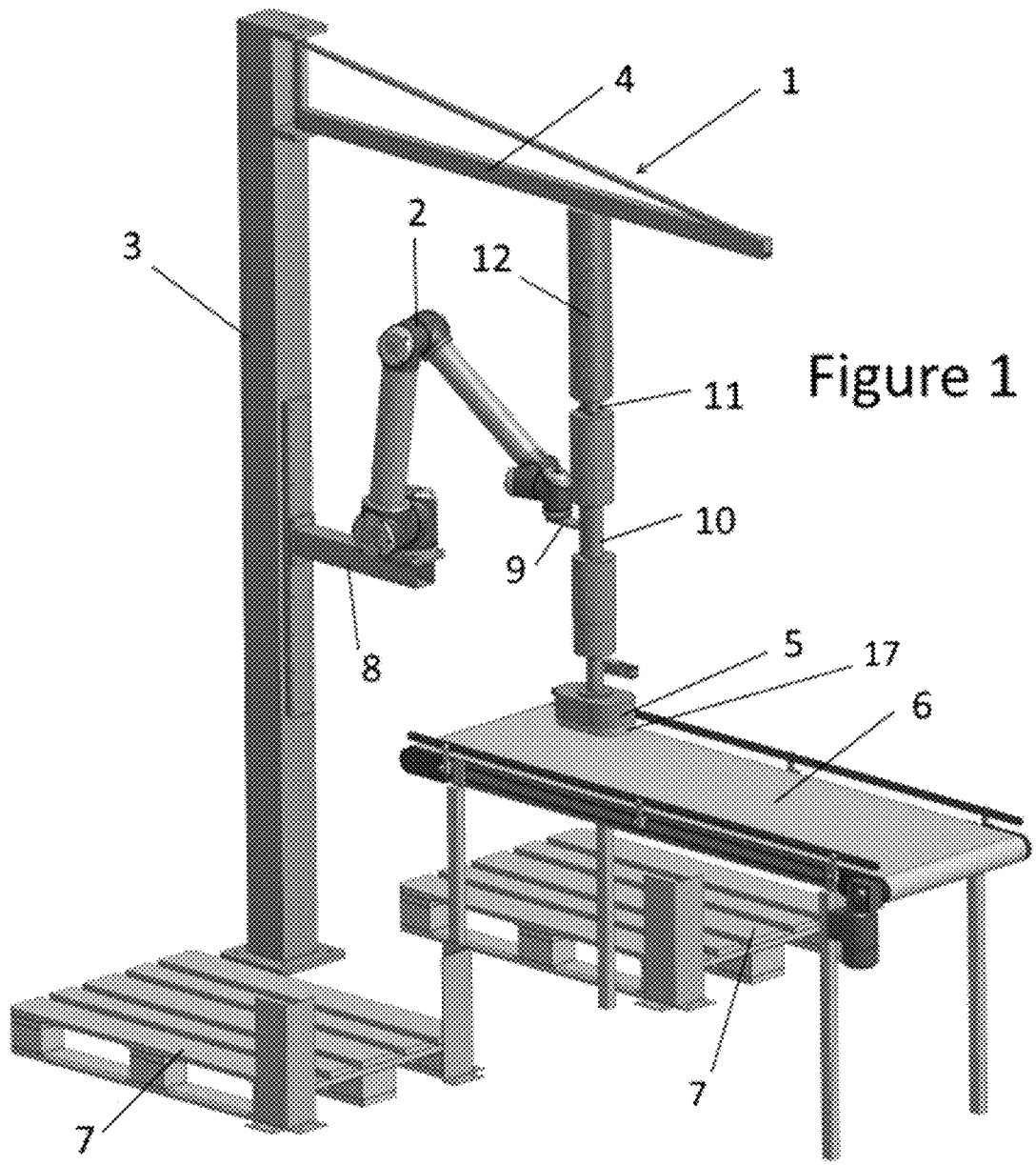
FIG. 1 discloses an embodiment of a system according to the invention illustrating how an object may be lifted and moved horizontally.

FIG. 1 shows a lifting device comprising a first unit 1 constituted by a vacuum lifter and a second unit 2 comprising or being constituted of a robot such as an UR10 robot from Universal Robots. In general, other lifters than vacuum lifters may be used, or a vacuum lifter may be supplemented with a different kind of lifter e.g. a hydraulic lifter. Although a specific robot is used for illustrative purposes in the shown embodiment, a skilled person will understand that the choice of robot is optional and other robots may be applied in the context of this invention.

The lifting device comprises a stationary stand comprising a vertically extending part 3 and a horizontally extending part 4 e.g. comprising a rail or similar which allows a horizontal movement in at least two radial directions i.e. back and forth. The horizontally extending part 4 may be pivotally mounted relative to the vertically extending part 3 thereby allowing a movement perpendicular to the radial direction along a circular path. The shown embodiment of a lifting device may lift an object weighing around 10-80 kg, e.g. 20-50 kg attached to the catching part 5. According to the embodiment shown in FIG. 1, the object may be caught by the catching part 5 such as a suction pad, which suction pad(s) 5 may be provided with a flexible or elastic lip 17 e.g. made of rubber or the like, providing an air-tight closure against the object, while the object is e.g. positioned on a conveyor belt 6 and then moved automatically to a pallet 7.

The first unit 1 comprises a lifting part 12 such as a hoisting tube which lifting part 12 may be moved in two directions along the horizontally extending part 4 thereby varying i.e. either reducing or increasing, the distance to the vertically extending part 3. The lifting part 12 has a variable length and is connected to the one or more catching parts 5 able to catch and/or attach to a surface or other part of an object and move the object in vertical direction.

Also, the first unit 1 comprises a slidable member 10 and a longitudinal member 11 which longitudinal member 11 may be fixed to the lower end of the lifting part 12. According to the shown embodiment, the longitudinal member 11 comprises or is constituted of a rigid pipe having a central opening 24 through which opening 24 air is directed to and from the suction pad 5. The sliding member 10 may be formed as an at least partly concentric pipe sliding along at least a part of the outer surface of the longitudinal member 11 between a first position and a second position.

The second unit 2 may at a first end or position be fixed to fastening means 8 which fastening means 8 are stationary relative to and fixed to the vertically extending part 3 of the stationary stand, and at a second e.g. opposite end or position the second unit 2 comprises a control member 9 which is stationary relative to and fixed to the sliding member 10.

As the control member 9 cannot move relative to the sliding member 10, it is possible for the second unit 2 to determine the vertical and horizontal position of an object caught by the catching part 5. The vertical position of an object is determined by the variable length of the lifting part 12 and the horizontal position of an object is determined by the angle of the horizontally extending part 4 relative to the vertically extending part 3 in combination with relative position of the lifting part 12 along the horizontally extending part 4.

A lifting part in form of a hoisting tube 12 may be suspended at an upper end and connected to a not shown vacuum source adapted to be switched on and off, the lower end of the hoisting tube 12 may then be connected to the longitudinal member 11 in such a way that air may flow through the longitudinal member 11 in any direction depending on the pressure inside the hoisting tube 12.

A valve device 13 may be configured to admit air into the hoisting tube 12 causing the hoisting tube 12 to either extend or contract in longitudinal direction depending on the air let in through the valve, the vacuum provided by the vacuum source and the corresponding pressure prevailing inside the hoisting tube 12. The opening of the valve device 13 is determined by the position of the sliding member 10 relative to the longitudinal member 11.

When the sliding member 10 is at a first end position e.g. at the top end position, the valve device 13 is closed allowing no intake or a minimum intake of air and the pressure inside the hoisting tube 12 is at its lowest minimizing the length of the hoisting tube 12 and maximizing the lifting power.

When the sliding member 10 is at a second, or opposite, end position e.g. at a lowest end position, the valve device 13 allows maximum intake of air and the pressure inside the hoisting tube 12 is then close to the surrounding pressure which is the maximum pressure possible, and the hoisting tube 12 is then extended to a maximum providing minimum lifting power.

The second unit 2 may comprise two parts of rigid pieces connected at adjoining ends by a hinge allowing a pivotal movement between the two rigid pieces when the two pieces move relative to each other. Further, the second unit 2 may at a first end be joined to the fastening means 8 by a pivotal hinge i.e. the second unit 2 may pivot both horizontally and vertically relative to the fastening means 8 and the vertically extending part 3—and at a second end the second unit 2 is fixed to the control member 9. The control member 9 may be moved both horizontally due to the movement of the rail 4 and vertically due to the pivotal attachment of the second unit 2 to the stationary stand 3 and the hinge between the two pieces constituting the second unit 2. The second unit 2 may comprise or be constituted of a known robot e.g. an UR10 robot available from Universal Robots.

The longitudinal member 11 and the sliding member 10 may comprise corresponding locking means configured to prevent the sliding member 10 from rotating relative to the longitudinal member. The locking means may simply be constituted by the shape of the profile of the inner surface of the sliding member 10 and the outer surface of the longitudinal member 11. If the corresponding profiles are not round, but comprise at least one flat surface, e.g. the profiles are shaped rectangular or polygonal, half-circular or like another circular segment or e.g. the profiles are shaped oval or another rounded shape not allowing rotation, then the two parts i.e. the sliding member 10 and the longitudinal member 11 are locked relative to each other in a rotational direction while the two parts may move relative to each other in a longitudinal direction.

Figure 2:
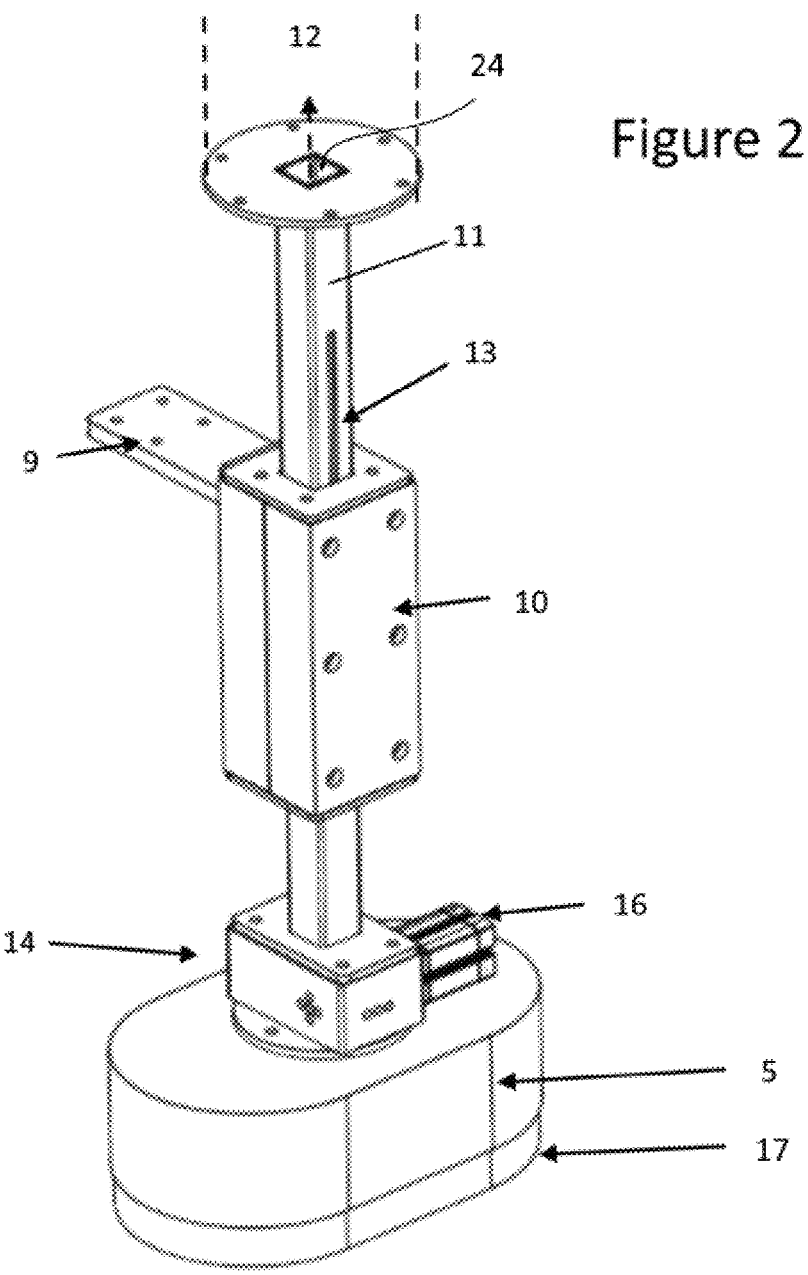
FIG. 2 discloses a view of a first embodiment of a connection according to the invention in combination with a part of a lifting device determined to catch an object.

FIG. 2 discloses an enlargement of part of an embodiment comprising a suction pad 5 attached to a longitudinal member 11 comprising a central opening 24.

When a lifting device according to the invention comprises a longitudinal member 11 with a central opening 24 and a catching part 5 in the form of a suction pad, the lifting device may be provided with a valve 14 which valve 14 may provide or allow a separation between an inner space and a vacuum of a hoisting tube 12 and the inner space or vacuum of the suction pad(s) 5.

In the embodiment of FIG. 2 the valve 14 is shaped as a box being positioned between the sliding member 10 and the suction pad 5 and when the valve 14 is closed it is possible to maintain a low pressure inside the hoisting tube 12 without an object being caught by and attached to the suction pad 5. In general, the valve 14 may comprise a plate 15 functioning as a throttle which may slide or pivot into a closed position where the plate 15 completely covers an opening 25 (see FIG. 5), the plate 15 may also be at an open position where the opening 25 close to the end of the longitudinal member 11 is completely open, and normally the plate 15 may be in all positions between these two end positions allowing detailed control of the air-intake through the opening 25 between the longitudinal member 11 and the suction pad 5.

Such a valve 14 may be advantageous if a continuous vacuum is applied to the hoisting tube 12 during operation.

Figure 6:
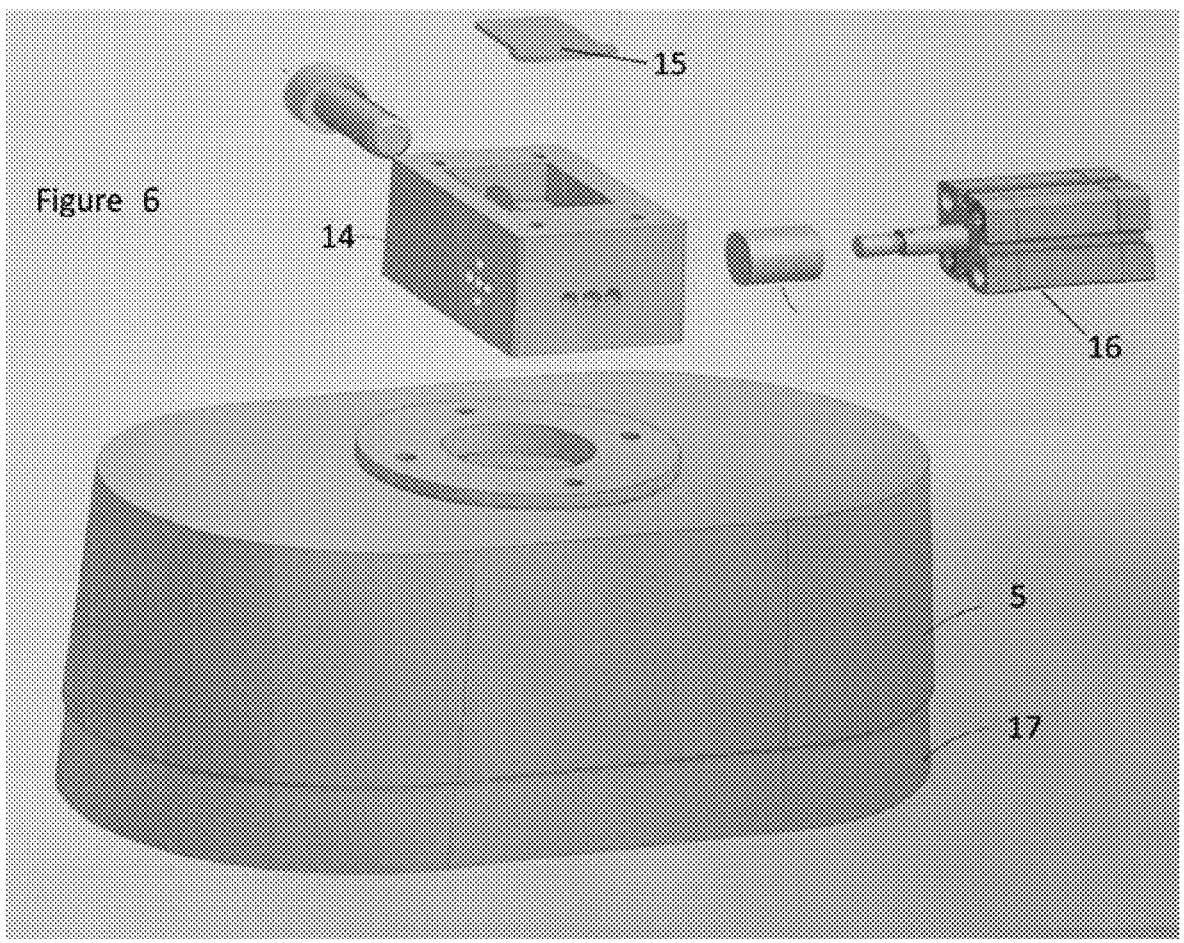
FIG. 6 discloses an exploded view of an embodiment of a separation valve and a drop-off valve.

Also, a lifting device according to the invention may comprise a drop-off valve 16 e.g. constituted of or comprising an air-filled cylinder. In case the valve 14 is closed while a vacuum is maintained in the longitudinal member 11, then it may be possible to release an object from the suction pad 5 by opening the drop-off valve 16. This may happen by letting air flow into the valve house of the valve 14 as shown in FIG. 2. FIG. 6 discloses an exploded view of an embodiment of a separation valve 14 and a drop-off valve 16.

Figure 3:
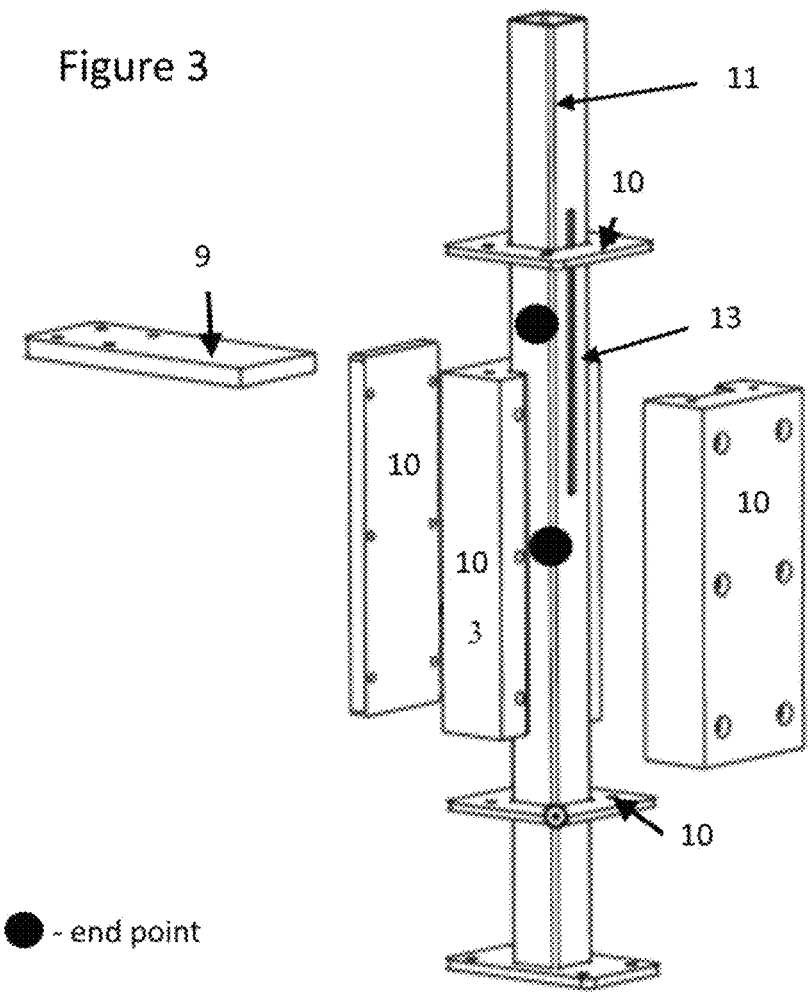
FIG. 3 discloses an exploded view of the first embodiment of a connection according to the invention.

FIGS. 2 and 3 disclose an embodiment, where the longitudinal member 11 is configured with a valve device 13 in the form of an opening 13 extending in the longitudinal direction of the longitudinal member 11. In general, when the longitudinal member 11 is configured with such an opening 13 for letting in air, then the opening 13 normally has the form of a slot e.g. at approximately the same length as the sliding member 10 or 10% longer or shorter than the sliding member 10 or at least of an area dimension e.g. length and width of a corresponding surface of the sliding member 10 which is configured to correspond to and at least partly cover the opening 13.

The sliding member 10 may be restricted in its movements beyond a first end position i.e. the longitudinal member 11 may be provided with an end stop which touches a part of the sliding member 10 when the first end position is reached and prevents the sliding member 10 from moving further in that direction. Likewise, the sliding member 10 may be restricted in its movements beyond a second end position i.e. the longitudinal member 11 may be provided with an end stop which touches a part of the sliding member 10 when the second end position is reached and prevents the sliding member 10 from moving further in that direction. The end stops may be constituted of a protruding part on the longitudinal member 11.

Figure 4:
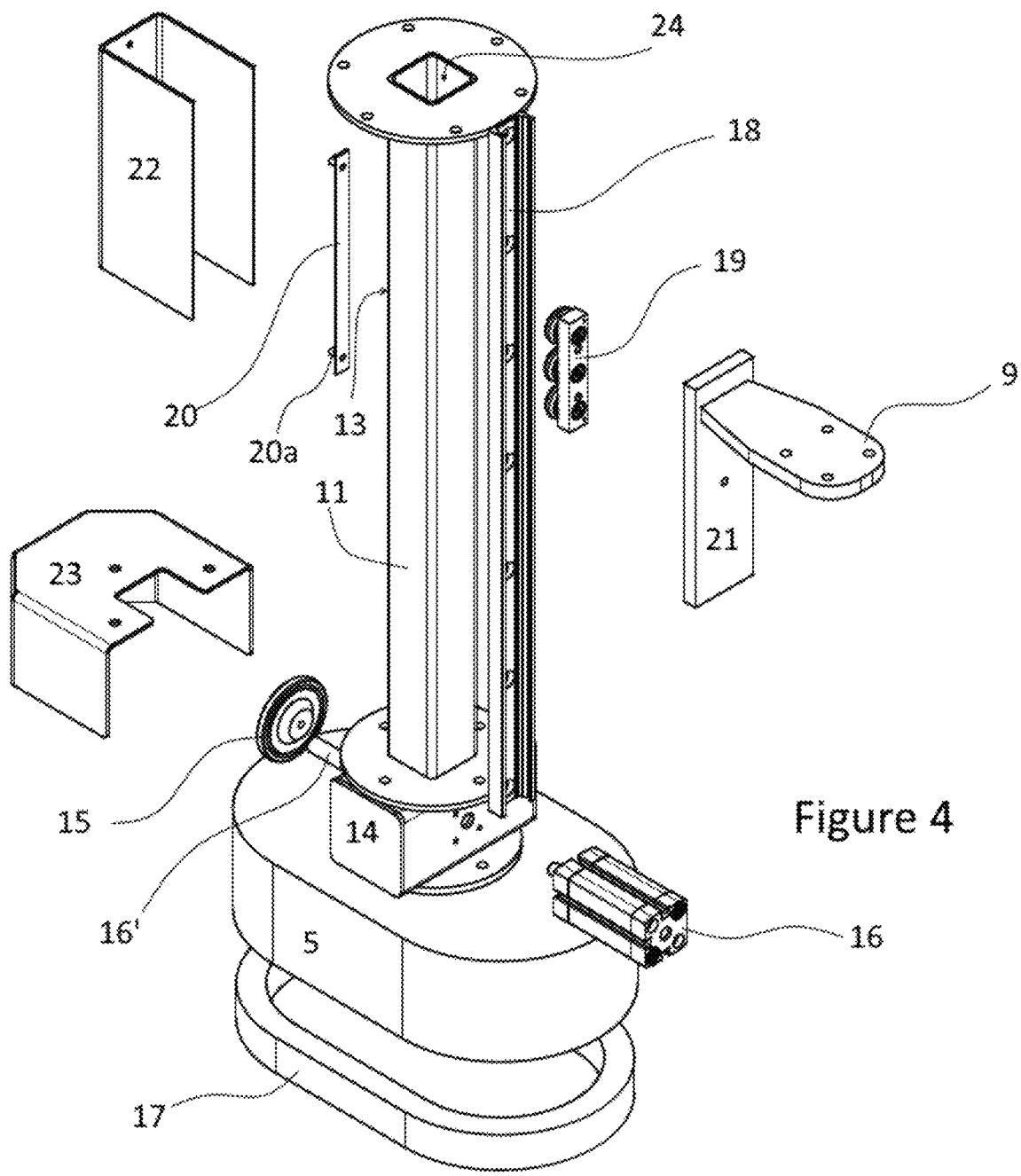
FIG. 4 discloses an exploded view of a second embodiment of a connection according to the invention in combination with a part of a lifting device determined to catch an object.

FIG. 4 discloses an exploded view of a second embodiment of a connection according to the invention including a lower end of a lifting device. According to this embodiment, the longitudinal member 11 comprises guiding means 18 in the form of a guide rail which is positioned on a different side i.e. the opposite side relative to the opening 13. The sliding member 10 comprises a sliding part 19 which is adapted to slide along the surfaces of the guide rail 18 and a closing part 20 adapted to close air intake through the opening 13, the shown embodiment of the sliding part 19 comprises 3 wheels which are in rolling contact with the guiding rail 18, but the sliding part 19 may have other shapes with same functionality. A cover part 22 and a handle part 21 of the sliding member 10 may form a closed unit or space extending around the longitudinal member 11. As the opening 13 through which air and dust must pass is separated from the sliding parts where dust is unwanted, the amount of dust between the contact surfaces of the sliding parts are significantly reduced and therefore wear of these parts are also reduced.

The closing part 20 may either be a part of the cover part 22 or the closing part may be floatingly mounted, where "floatingly mounted" means that the closing part 20 can be moved relative to the cover part 22 in a direction perpendicular to the surface of the longitudinal member 11 comprising the opening 13. The closing part 20 may then be moved towards the opening 13 by suction i.e. the closing part 20 is sucked against the opening 13 when there is vacuum or low pressure inside the longitudinal member 11, but when the vacuum or low pressure is removed, the closing part 20 will not be in closing contact with opening 13 of the longitudinal member 11. The floating mounting may be provided as two or more protruding parts 20a may be positioned through openings in the cover part 22, the cover part 22 may be attached to the handle 21 thereby securing the closing part 20 to the handle part 21 and making it possible to control the exact position of the closing part 20 relative to the opening 13. That the closing part 20 is floating will cause the closure function to be maintained despite any wear of the surfaces of the longitudinal member 11 and the surface of the closing part 20.

The embodiment disclosed in FIG. 4 comprises a drop-off valve 16 comprising a protruding part 16' which protruding part 16' during operation is in contact with a plate 15. During operation the plate 15 may be covered by a cover 23. During operation, the drop-off valve 16 and the protruding part 16' may be pushed forward e.g. by pressurized air and the protruding part 16' then pushes the plate 15 away from the valve box 14 creating access to the surrounding air pressure. When the pressure inside the suction pad 5 is equalized with the surrounding pressure, the suction pad loses its suction power and release any object attached to the suction pad 5.

Figure 5:
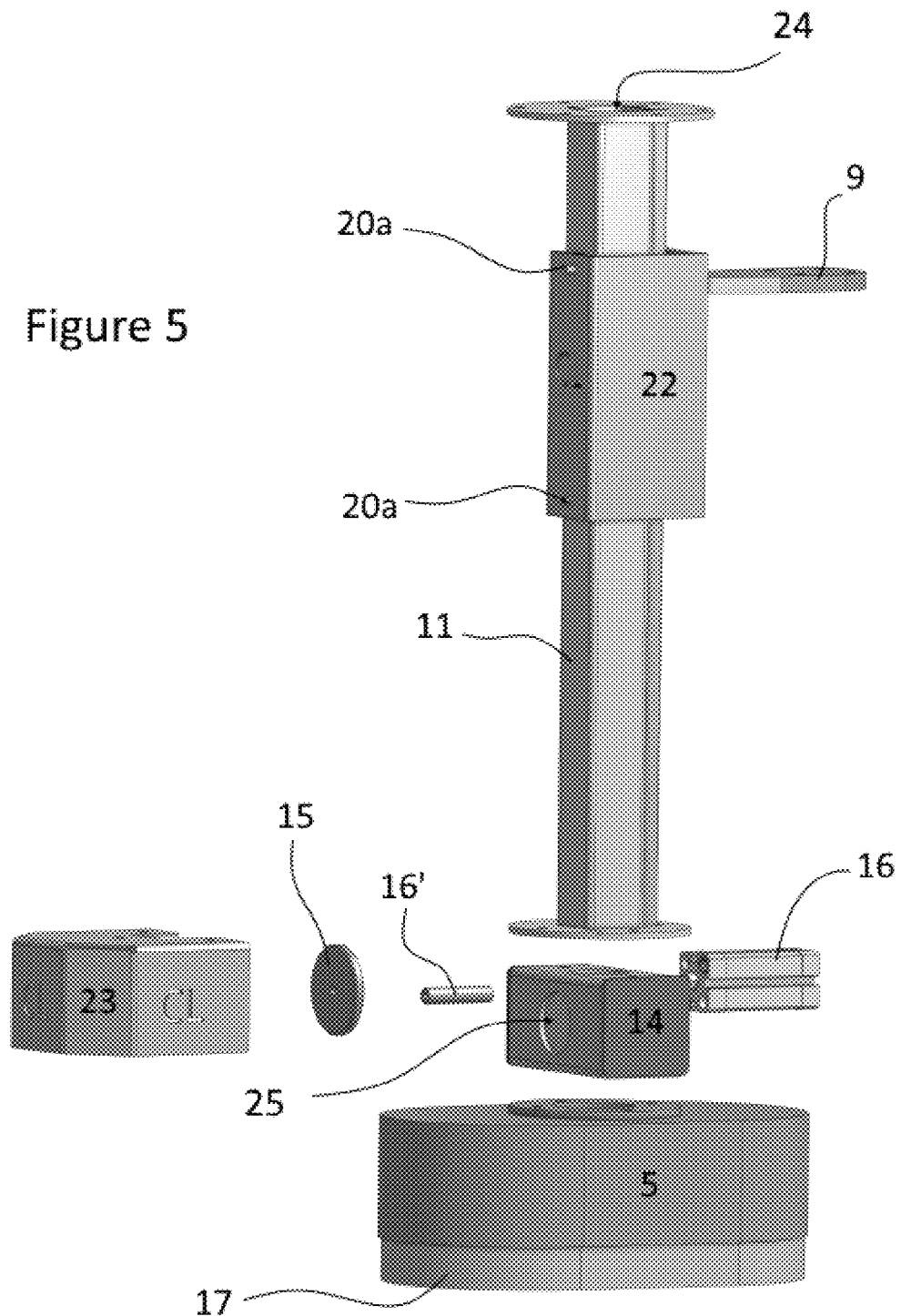
FIG. 5 discloses the same embodiment as FIG. 4 in another view.

FIG. 5 discloses a view of the second embodiment of a connection according to the invention in assembled mode. The ends of the protruding parts 20a of the closing part 20 can be seen extending through openings of the cover 22.

In general, to be able to maintain a forceful suction on the suction pad(s) 5 which suction preferably is on-off i.e. either not working or full vacuum, while exercising a softer suction on the hoisting tube 12 where the pressure inside the hoisting tube 12 determines the height of the suction pad(s), the vacuum system may comprise or be constituted of two vacuum systems where a first vacuum system exercises a suction on the suction pad(s) 5 while a second vacuum system determines the pressure inside the hoisting tube 12. By applying two separated vacuum systems it is possible to provide a very precise control of the hoisting tube 12 and use the system to lift difficult objects which may necessitate use of a strong suction.

In general, a valve 14 comprises a throttle positioned in the air flow between the central air opening of the longitudinal member 11 and the space inside a suction pad where a vacuum or low pressure may be maintained. Such a valve 14 makes it possible to maintain a low pressure inside a suction pad and providing a high suction power which keeps a lifted object attached to the suction pad, while keeping a higher pressure inside a hoisting tube thereby lowering an object attached to the suction pad.

In general, a drop-off valve 16 comprises or provides a controlled air inlet allowing air to enter into an otherwise closed space providing the vacuum or reduced pressure holding an object to be or being lifted. The closed space may be formed of inner surfaces of the walls of a suction pad, a surface of an object being lifted, and a plate 15 or other feature of same functionality in a valve 14 excluding a low or otherwise different pressure inside a hoisting tube.

The present invention also relates to the following embodiments of respectively a connection and a system:

1. A connection between a first and a second unit, the first unit (1) is configured to catch an object and provide power for moving the object in a vertical direction, and the second unit (2) is configured to control a vertical position of the object,
   wherein the connection comprises
   a sliding member (10) configured to slide in two directions, back and forth between a first and a second end position, along a longitudinal member (11) of the first unit, the sliding member (10) is fixed to an attachment point of the second unit (2) by a rigid joint configured to transfer all movements induced by the second unit (2) to the sliding member (10).

2. A connection according to the above embodiments, wherein the longitudinal member (11) is configured with an opening (13) extending in the longitudinal direction of the longitudinal member (11) and the opening (13) is configured so that the opening (13) may be covered by the sliding member (10) when the sliding member is at a first end position whereas the opening (13) is not covered or only partly covered by the sliding member (10) when the sliding member (10) is in a second end position.

3. A connection according to any of the previous defined embodiments, wherein the sliding member (10) has an inner profile corresponding to an outer profile of the longitudinal member (11) of the first unit (1), and the corresponding profiles are not round or a similar shape allowing rotation of the sliding member (10) relative to the longitudinal member (11).

4. A connection according to any of the previous defined embodiments, wherein the sliding member (10) has an inner profile corresponding to an outer profile of the longitudinal member (11) of the first unit (1), and the corresponding profiles are polygonal e.g. rectangular or oval or has a protruding part e.g. a longitudinal extending list or similar preventing rotation of the sliding member (10) relative to the longitudinal member (11).

5. A system for lifting and horizontally displacing an object, the system comprising
   a first unit (1) configured with one or more suction pads (5) able to catch the object and move the object in vertical direction; and a second unit (2) configured to control vertical and horizontal position of the object; and a stationary stand (3, 4) to which the first and the second unit are fixed and supported, the first unit (1) comprises a longitudinal member (11); and the second unit (2) comprises a sliding member (10) configured to move between a first and a second position relative to the longitudinal member (11), when the sliding member (10) moves in one direction along the longitudinal member (11) then the suction pad (5) is lowered and when the sliding element is moved in a second opposite direction, then the suction pad (5) is raised, wherein the sliding member (10) is fixed to the longitudinal member (11) in a rotational direction and the second unit (2) comprises a control member which control member can move the point/part/end fixed to the sliding member (10) in both vertical and horizontal direction.

6. A system according to the previous defined embodiments of the system, wherein the first unit (1) comprises a vertical hoisting tube (12) suspended at an upper end and connected to a vacuum source adapted to be switched on and off, which hoisting tube (12) at a lower end connects to the longitudinal member (11) allowing a gas flow through both the hoisting tube (12) and the longitudinal member (11).

7. A system according to any of the previous defined embodiments of the system, wherein a valve device (13) is configured for admitting gas to the hoisting tube (12) so that the hoisting tube is axially extensible and contractible in dependence on the air pressure prevailing in the hoisting tube.

8. A system according to any of the previous defined embodiments of the system, wherein the position of the sliding member (10) controls the opening of the valve device.

9. A system according to any of the previous defined embodiments of the system, wherein the valve device is constituted by an opening (13) extending in the longitudinal direction of the longitudinal member (11).

10. A system according to any of the previous defined embodiments of the system, wherein the second unit (2) comprises at least two pieces or arms joined by a pivotal hinge and placed in extension of each other, and the second unit (2) is at one end fixed pivotally to the stationary stand (3) and at a second end fixed to the sliding member (10).

11. A system according to any of the previous defined embodiments of the system, wherein the control member and the sliding member comprise corresponding locking means configured to prevent the sliding member from moving in any other directions relative to the longitudinal member than a defined route between the first and second position.

12. A system according to any of the previous defined embodiments of the system, wherein suction pad(s) of the system may be configured with a secondary suction system whereas the hoisting tube is configured with a primary suction system.

LIST OF REFERENCE NUMBERS

1 First unit (e.g. a vacuum lifter)
2 Second unit (e.g. a robot)
3 Vertically extending part (stationary stand)
4 Horizontally extending part (stationary stand)
5 Catching part e.g. suction pad
6 Conveyor belt
7 Pallets
8 Fastening means
9 Control member or handle for control member
10 Slidable member
11 Longitudinal member
12 Lifting part e.g. hoisting tube
13 Valve device such as an opening in 11
14 Valve
15 Plate inside valve 14
16 Drop-off valve
17 Rubber or foam lip
18 Guide rail
19 Sliding part
20 Closing part
20a Protruding ends of fastening means for closing part 20
21 Handle part of sliding part 10
22 Cover for slidable member
23 Cover for drop-off valve
24 Central opening of 11

The invention claimed is:

1. A lifting device comprising a first unit (1) and a second unit (2), the first unit (1) configured to catch, hold, or both catch and hold an object and provide power for moving the object in a vertical direction, and the second unit (2) configured to control a vertical position of the object, wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);

a sliding member (10) configured to slide in two directions between a first end position and a second end position along the longitudinal member (11), and an actual position of the sliding member (10) relative to the longitudinal member (11) configured to determine lifting power of the lifting part (12);

wherein the second unit (2) comprises a first attachment position and a second attachment position and the first attachment position is fixed to the vertically extending part (3) of the first unit (1);

the second attachment position is fixed to the sliding member (10) of the first unit (1) by a rigid joint configured to transfer all movements induced at the second attachment position by the second unit (2) to the sliding member (10), wherein the second unit (2) is configured to control a horizontal position of the object and the second unit (2) is configured to move relative to the horizontally extending part (4).

2. A lifting device comprising a first unit (1) and a second unit (2), the first unit (1) configured to catch, hold, or both catch and hold an object and provide power for moving the object in a vertical direction, and the second unit (2) configured to control a vertical position of the object, wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part

(12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2) to the sliding member (10),
wherein the second unit (2) comprises or is constituted of a robot configured to control the horizontal and vertical position of the second position relative to the first position where a robot is defined as a component or system capable of carrying out a series of actions or movements automatically.

3. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2) to the sliding member (10),
wherein the longitudinal member (11) comprises a central opening for forced air, wherein the longitudinal member (11) is configured with an opening (13) extending in a longitudinal direction of a wall of the longitudinal member (11), wherein the opening (13) allows air to flow to and from the central opening and surroundings, wherein the opening (13) is configured so that the opening (13) is covered by the sliding member (10) when the sliding member is at the first end position whereas the opening (13) is not covered or only partly covered by the sliding member (10) when the sliding member (10) is at the second end position.

4. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2 to the sliding member (10),
wherein the sliding member (10) has an inner surface profile corresponding to an outer surface profile of the longitudinal member (11) of the first unit (1).

5. A lifting device according to claim 4, wherein the corresponding surface profiles are shaped so as to prevent rotation of the sliding member (10) relative to the longitudinal member (11).

6. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4 and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2) to the sliding member (10), wherein the sliding member (10) has an inner surface profile corresponding to an outer surface profile of the longitudinal member (11) of the first unit (1), and the corresponding profiles are polygonal or oval or have a protruding part preventing rotation of the sliding member (10) relative to the longitudinal member (11).

7. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2) to the sliding member (10),
wherein the lifting part (12) is a vacuum hoisting tube (12) connected to a vacuum source, wherein the vacuum hoisting tube (12) is connected to the longitudinal member (11) allowing an airflow generated by the vacuum source through both the vacuum hoisting tube (12) and the longitudinal member (11).

8. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2) to the sliding member (10),
wherein a valve device (13) is configured for admitting air to the hoisting tube (12) so that the hoisting tube is axially extensible and contractible in dependence on the air pressure prevailing in the hoisting tube.

9. A lifting device according to claim 8, wherein the position of the sliding member (10) controls an opening of the valve device (13).

10. A lifting device according to claim 8, wherein the valve device (13) is constituted by an opening extending in a longitudinal direction of the longitudinal member (11).

11. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);
wherein the second unit (2) comprises a first attachment position and a second attachment position and
the first attachment position is fixed to the vertically extending part (3) of the first unit (1);
the second attachment position is fixed to the sliding member (10) of the first unit (1) by a rigid joint configured to transfer all movements induced at the second attachment position by the second unit (2) to the sliding member (10),
wherein the second unit (2) comprises at least two pieces or arms joined by a pivotal hinge and placed in extension of each other, and the second unit (2) is at one end fixed pivotally to the vertically extending part (3) and at a second end fixed to the sliding member (10).

12. A lifting device comprising a first unit (1) and a second unit (2), the first unit (1) configured to catch, hold, or both catch and hold an object and provide power for moving the object in a vertical direction, and the second unit (2) configured to control a vertical position of the object,
wherein the first unit (1) comprises:
a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);
a sliding member (10) configured to slide in two directions between a first end position and a second end position along the longitudinal member (11), and an actual position of the sliding member (10) relative to the longitudinal member (11) configured to determine lifting power of the lifting part (12);

wherein the second unit (2) comprises a first attachment position and a second attachment position and the first attachment position is fixed to the vertically extending part (3) of the first unit (1);

the second attachment position is fixed to the sliding member (10) of the first unit (1) by a rigid joint configured to transfer all movements induced at the second attachment position by the second unit (2) to the sliding member (10), wherein the second unit (2) at a first attachment position is attached or fixed to fastening means (8) that are stationary relative to and fixed to the vertically extending part (3), and at a second attachment position the second unit (2) comprises a control member (9) stationary relative to and fixed to the sliding member (10).

13. A lifting device according to claim 12, wherein the control member (9) and the sliding member (10) comprise corresponding locking means configured to prevent the sliding member (10) from moving in any other directions relative to the longitudinal member (11) than a defined route between the first and second position.

14. A lifting device comprising a first unit (1) and a second unit (2), the first unit (1) configured to catch, hold, or both catch and hold an object and provide power for moving the object in a vertical direction, and the second unit (2) configured to control a vertical position of the object, wherein the first unit (1) comprises:

a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);

a sliding member (10) configured to slide in two directions between a first end position and a second end position along the longitudinal member (11), and an actual position of the sliding member (10) relative to the longitudinal member (11) configured to determine lifting power of the lifting part (12);

wherein the second unit (2) comprises a first attachment position and a second attachment position and the first attachment position is fixed to the vertically extending part (3) of the first unit (1);

the second attachment position is fixed to the sliding member (10) of the first unit (1) by a rigid joint configured to transfer all movements induced at the second attachment position by the second unit (2) to the sliding member (10), said lifting device further comprising a valve (14) positioned between the sliding member (10) and the catching part (5) formed as a suction pad, the valve (14) configured to separate an air flow between the inside the lifting part (12) and an interior of the catching part (5).

15. A lifting device according to claim 14, wherein the valve (14) comprises a unit (15) that is movable between a closed position preventing air flow from hoisting tube (12) to catching part (5) and an open position allowing air flow from hoisting tube (12) to catching part (5).

16. A lifting device according to claim 14, wherein the longitudinal member (11) comprises guiding means (18) positioned on a surface opposite a surface of the valve device (13), wherein the guiding means (18) corresponds to a sliding part (19) of the sliding member (10) and the sliding part (19) is adapted to slide along the guiding means (18).

17. A lifting device according to claim 14, wherein the lifting part (12) is a vacuum hoisting tube (12) connected to a vacuum source, wherein the vacuum hoisting tube (12) is connected to the longitudinal member (11) allowing an airflow generated by the vacuum source through both the vacuum hoisting tube (12) and the longitudinal member (11) providing a lifting power, and optionally a second vacuum source provides an independent vacuum for the catching part (5).

18. A lifting device comprising a first unit (1) and a second unit (2), the first unit (1) configured to catch, hold, or both catch and hold an object and provide power for moving the object in a vertical direction, and the second unit (2) configured to control a vertical position of the object, wherein the first unit (1) comprises:

a stationary vertically extending part (3), a horizontally extending part (4) and a lifting part (12) having a first attachment position and a second attachment position, at the first attachment position the lifting part (12) is attached or fixed to the horizontally extending part (4) and at the second attachment position the lifting part (12) is attached or fixed to a longitudinal member (11), the longitudinal member (11) comprising a catching part (5);

a sliding member (10) configured to slide in two directions between a first end position and a second end position along the longitudinal member (11), and an actual position of the sliding member (10) relative to the longitudinal member (11) configured to determine lifting power of the lifting part (12);

wherein the second unit (2) comprises a first attachment position and a second attachment position and the first attachment position is fixed to the vertically extending part (3) of the first unit (1);

the second attachment position is fixed to the sliding member (10) of the first unit (1) by a rigid joint configured to transfer all movements induced at the second attachment position by the second unit (2) to the sliding member (10), wherein the sliding member (10) comprises a closing part (20) adapted to close or eliminate air intake through a valve device (13) formed as an opening, the closing part (20) is movable with respect to the valve device (13) formed as an opening.

19. A lifting device according to claim 18, wherein the closing part (20) is mounted by two or more protruding parts (20a) extending perpendicular to a surface around the valve device (13) formed as an opening through openings in a cover (22) of the sliding member (10).

* * * * *